(12) United States Patent
Yu et al.

(10) Patent No.: US 6,428,259 B1
(45) Date of Patent: Aug. 6, 2002

(54) SELF-DRILLING SCREW (76) Inventors: Chao-Hsin Yu; Chin-Sun Chen, both of P.O. Box 196, Feng Yuan City, Taichung Hsien (TW)

( * ) Notice: Subject to any disclaimer, the term of this patent is extended or adjusted under 35 U.S.C. 154(b) by 0 days.

(21) Appl. No.: 09/755,304

(22) Filed: Dec. 29, 2000

(30) Foreign Application Priority Data

Mar. 29, 2000 (TW) ........................................ 89205153 U (51) Int. Cl.⁷ ................................................ F16B 25/10
(52) U.S. Cl. .................................. 411/387.8; 411/387.1
(58) Field of Search ................... 411/386, 387.1–387.8, 411/417, 418

(56) References Cited

U.S. PATENT DOCUMENTS 3,094,893 A * 6/1963 Lindstrom
3,648,560 A * 3/1972 Roser
4,028,987 A * 6/1977 Wilson
4,271,554 A * 6/1981 Grenell
4,386,882 A * 6/1983 Bereiter
4,697,969 A * 10/1987 Sparkes

FOREIGN PATENT DOCUMENTS

DE 2551510 * 5/1977

* cited by examiner

*Primary Examiner*—Flemming Saether (57) ABSTRACT

A flat headed screw structure includes a screw body having an axle face formed with an axially extended thread, and having a tail end provided with at least one cut groove. The cut groove has a top defining a cut groove opening. The cut groove opening further defines a scrap draining chute toward a center of the screw body. The scrap draining chute extends into the inner portion of the screw body and exceeds the central line of the screw body through a predetermined angle, thereby preventing scraps from blocking the cut groove opening.

1 Claim, 12 Drawing Sheets

SELF-DRILLING SCREW

BACKGROUND OF THE INVENTION

1. Field of the Invention

The present invention relates to a flat headed screw structure, and more particularly to a flat headed screw structure provided with a scrap draining chute, thereby preventing the scraps from blocking the cut groove opening, so that the screw body may be tapped and locked into a workpiece quickly and conveniently.

2. Description of the Related Prior Art

Figure 1:
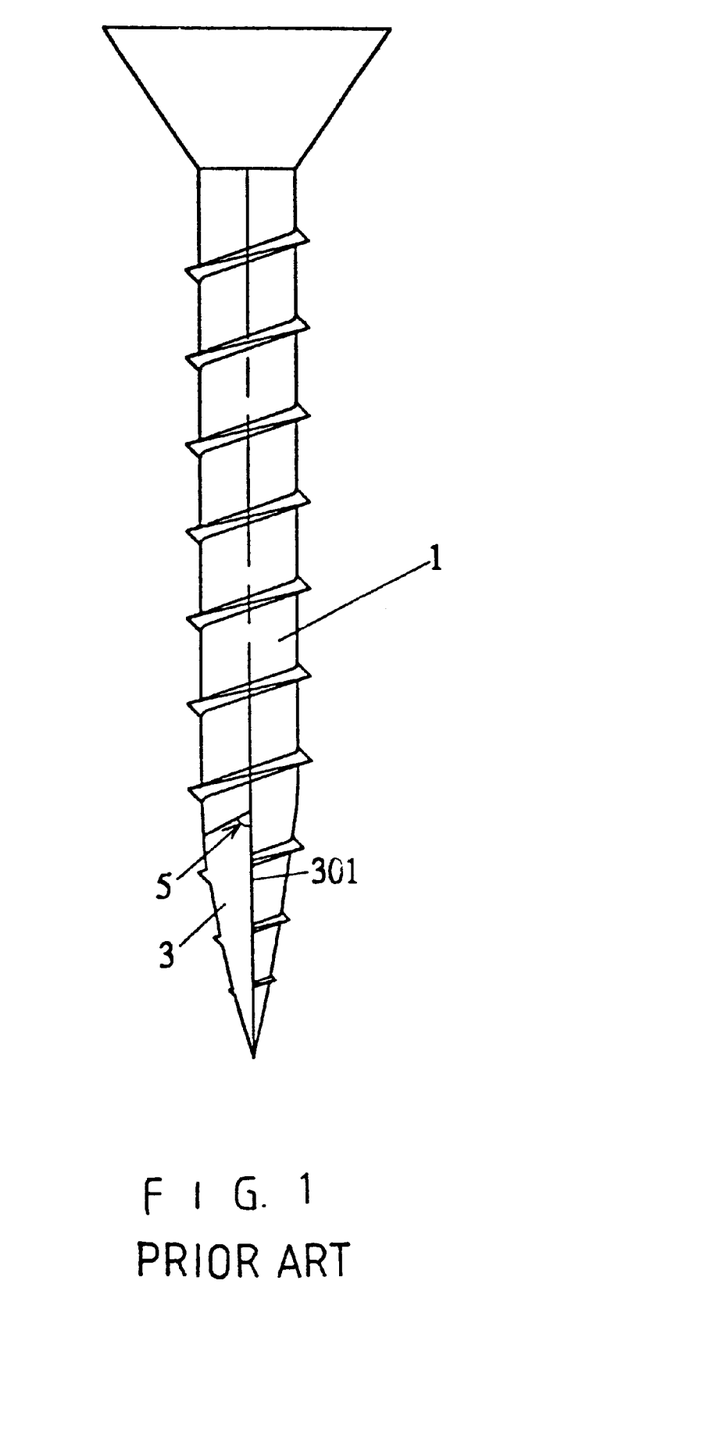
FIG. 1 is a front plan view of a first conventional flat headed screw in accordance with the prior art.
Figure 2:
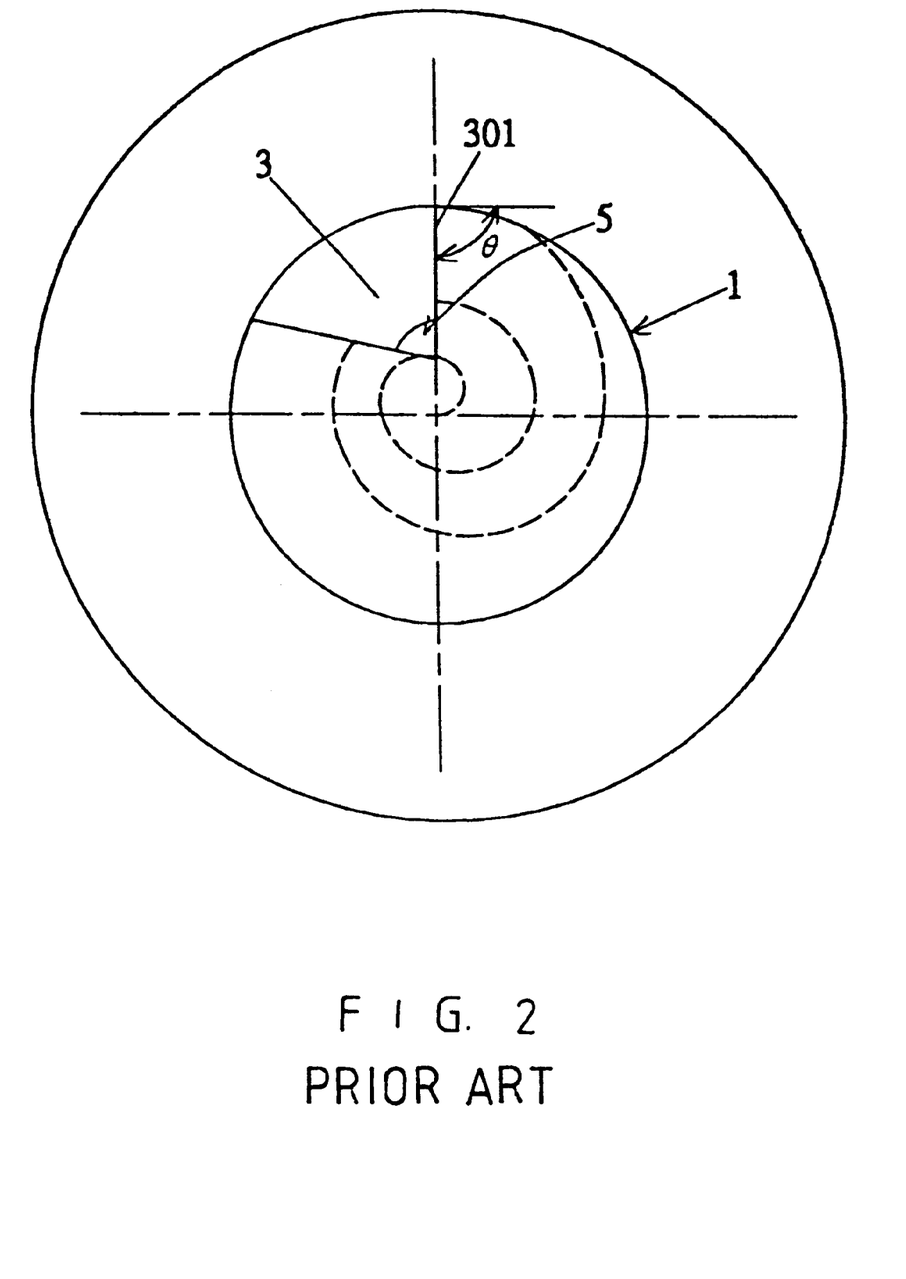
FIG. 2 is a bottom plan view of the first conventional flat headed screw as shown in FIG. 1.

A first conventional flat headed screw in accordance with the prior art shown in FIGS. 1 and 2 comprises a screw body 1 defining a groove 3 having two cut edges 301 and a groove opening 5. The two cut edges 301 are straight edges, and the groove opening 5 is substantially 90 degree, so that the tangent angle θ between the outer periphery of the screw body 1 and the cut edge 301 is greater than or equal to 90 degree. In such a manner, when the screw body 1 is tapped into a workpiece to a depth exceeding the length of the groove 3, the scrap produced from the workpiece will block the groove opening 5, thereby greatly decreasing the cutting effect and velocity of the two cut edges 301 of the groove 3. In addition, the screw body 1 is subjected to a larger torque due to the blocked scrap, so that the screw body 1 is easily worn out during a period of utilization, thereby decreasing the lifetime of the screw body 1.

Figure 3:
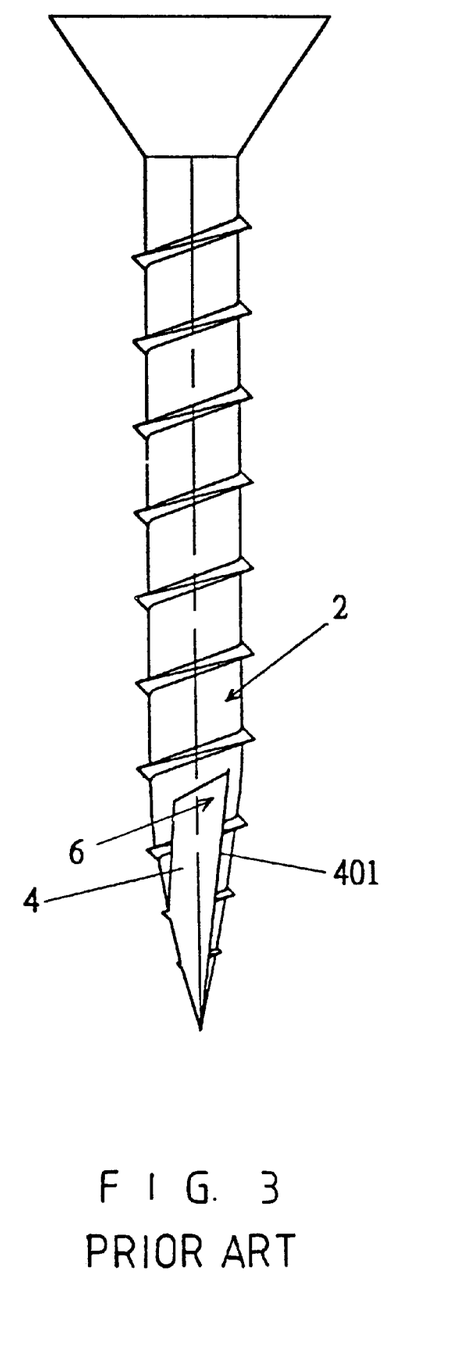
FIG. 3 is a front plan view of a second conventional flat headed screw in accordance with the prior art.
Figure 4:
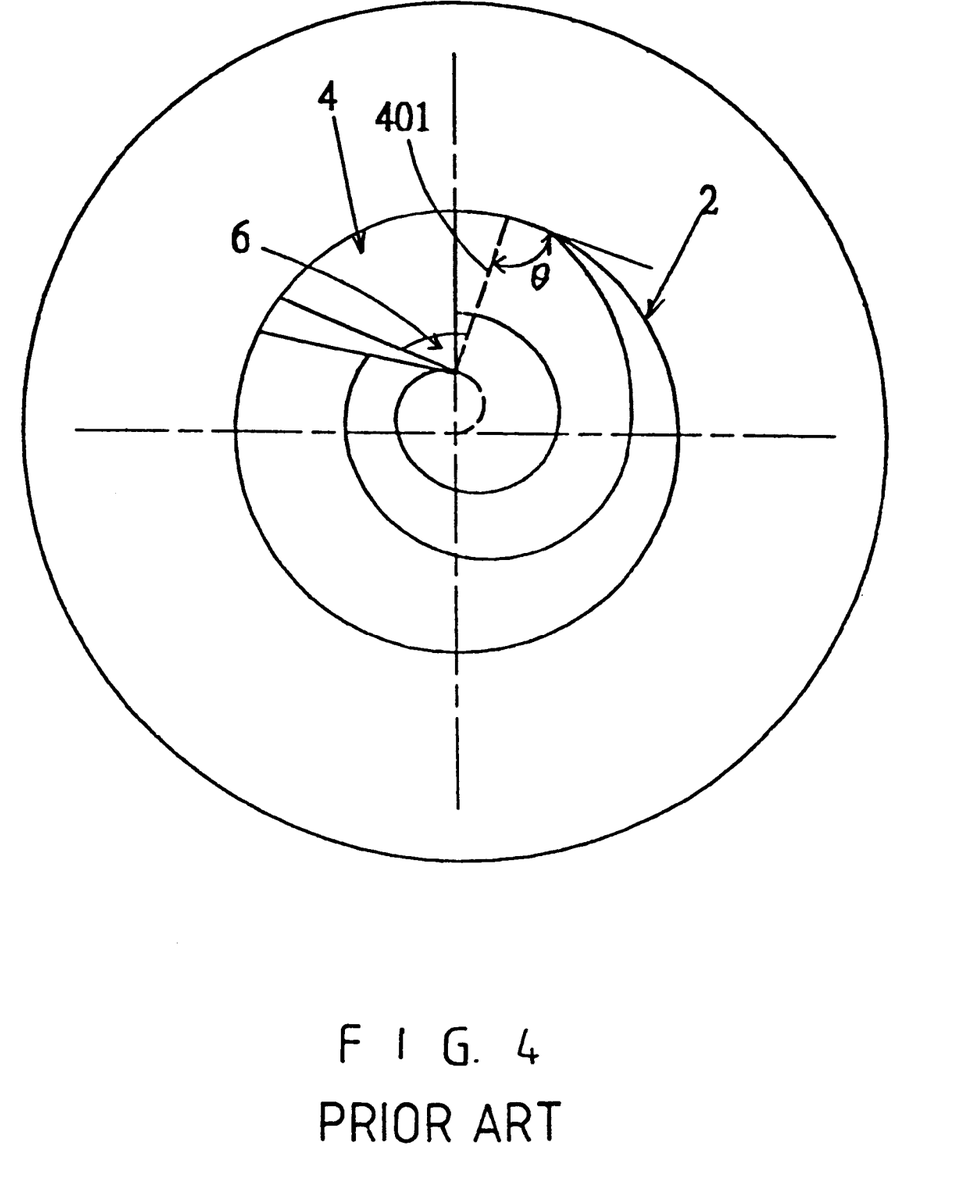
FIG. 4 is a bottom plan view of the second conventional flat headed screw as shown in FIG. 3.

A second conventional flat headed screw in accordance with the prior art shown in FIGS. 3 and 4 comprises a screw body 2 defining a groove 4 having two cut edges 401 and a groove opening 6. The two cut edges 401 are inclined edges, and the groove opening 6 is substantially 90 degree, so that the tangent angle θ between the outer periphery of the screw body 2 and the cut edge 401 is greater than or equal to 90 degree. In such a manner, when the screw body 2 is tapped into a workpiece to a depth exceeding the length of the groove 4, the scrap produced from the workpiece will block the groove opening 6, thereby greatly decreasing the cutting effect and velocity of the two cut edges 401 of the groove 4. In addition, the screw body 2 is subjected to a larger torque due to the blocked scrap, so that the screw body 2 is easily worn out during a period of utilization, thereby decreasing the lifetime of the screw body 2.

SUMMARY OF THE INVENTION

The present invention has arisen to mitigate and/or obviate the disadvantage of the conventional flat headed screw.

The primary objective of the present invention is to provide a flat headed screw structure which is provided with a scrap draining chute, thereby preventing the scraps from blocking the cut groove opening so as to drain the scraps conveniently, so that the screw body may be tapped and locked into a workpiece quickly and conveniently.

In accordance with one aspect of the present invention, there is provided a flat headed screw structure comprising: a screw body, the screw body having an axle face formed with an axially extended thread, and having a tail end provided with at least one cut groove;

the improvement comprising:

the cut groove having a top defining a cut groove opening, the cut groove opening further defining a scrap draining chute toward a center of the screw body, the scrap draining chute extending into an inner portion of the screw body and exceeding a central line of the screw body through a predetermined angle, thereby preventing scraps from blocking the cut groove opening.

Further benefits and advantages of the present invention will become apparent after a careful reading of the detailed description with appropriate reference to the accompanying drawings.

DETAILED DESCRIPTION OF THE INVENTION

Figure 5:
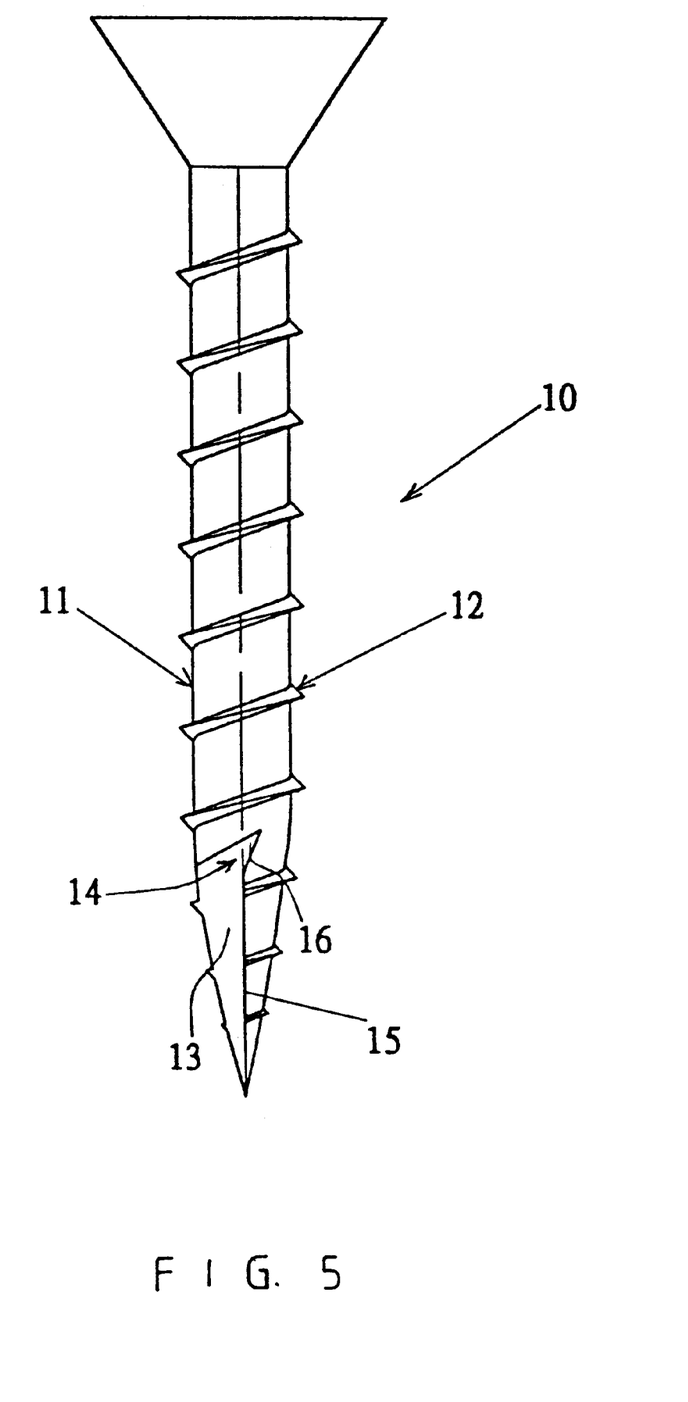
FIG. 5 is a front plan view of a flat headed screw structure in accordance with a first embodiment of the present invention.
Figure 6:
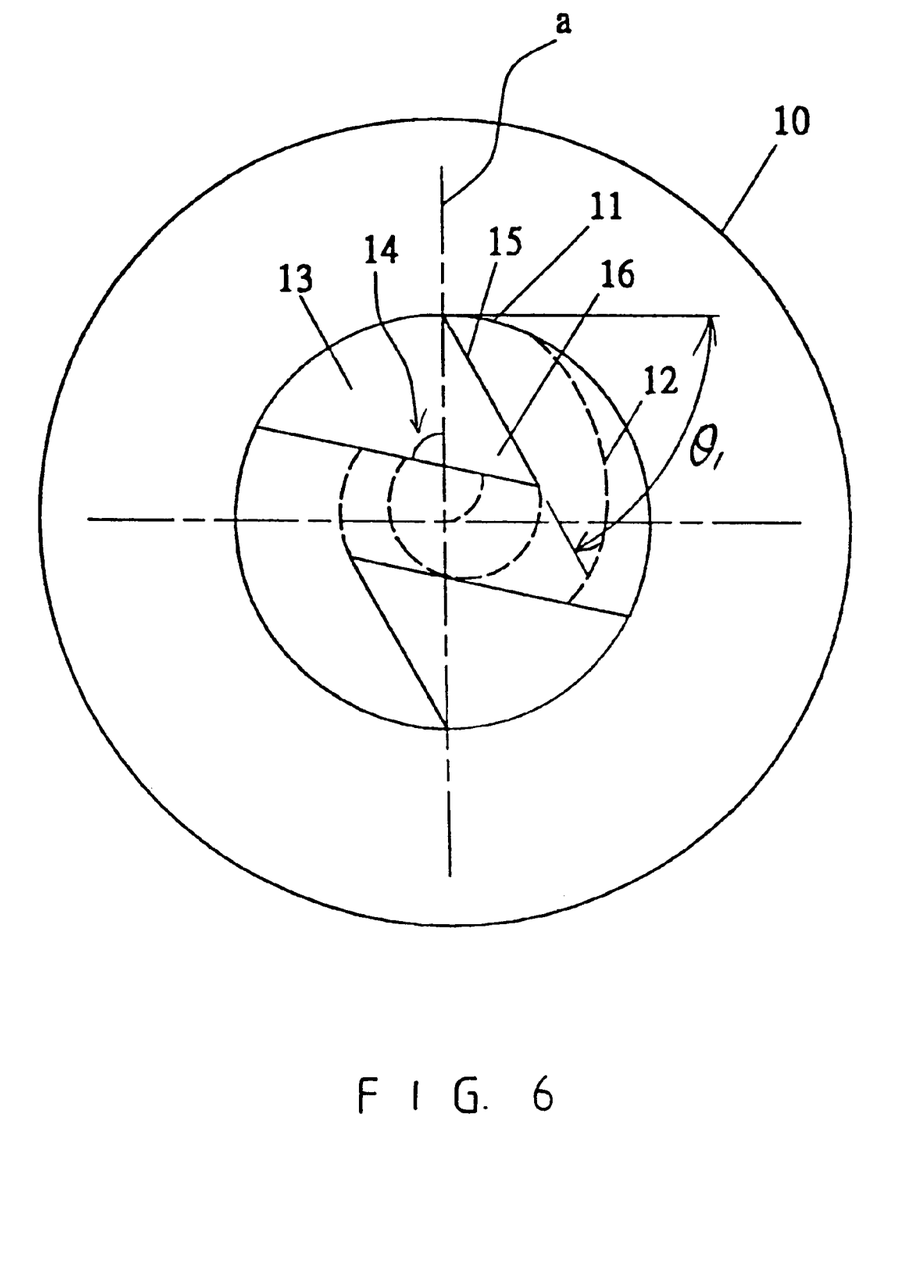
FIG. 6 is a bottom plan view of the flat headed screw structure as shown in FIG. 5.

Referring to the drawings and initially to FIGS. 5 and 6, a flat headed screw structure 10 in accordance with a first embodiment of the present invention comprises a screw body 11. The screw body 11 has an axle face formed with an axially extended thread 12, and has a tail end provided with two cut grooves 13. Each of the two cut grooves 13 has a top defining a cut groove opening 14. In the preferred embodiment, the cut groove opening 14 of the cut groove 13 is substantially right-angled (90°), the so-called right-angled cutting blade. The two cut edges 15 forming the cut groove 13 are substantially straight edges.

The improvement of the present invention is described as follows.

The top of the cut groove opening 14 each of the two cut grooves 13 further defines a scrap draining chute 16 toward the center of the screw body 11. The scrap draining chute 16 is substantially right-angled. The scrap draining chute 16 extends into the inner portion of the screw body 11 and exceeds the central line "a" of the screw body 11 through a predetermined angle, so that the tangent angle $θ_1$ of the screw body 11 and each of the two cut edges 15 is smaller than 90°, thereby forming a sharper angle, so as to obtain a better cutting and scraping function, so that the scraps cut by the two cut edges 15 of the cut groove 13 are moved upward through the cut groove 13, and are drained outward through the scrap draining chute 16, thereby preventing the scraps from blocking the cut groove opening 14, so that the screw body 11 may be tapped and locked into a workpiece quickly and conveniently.

Figure 7:
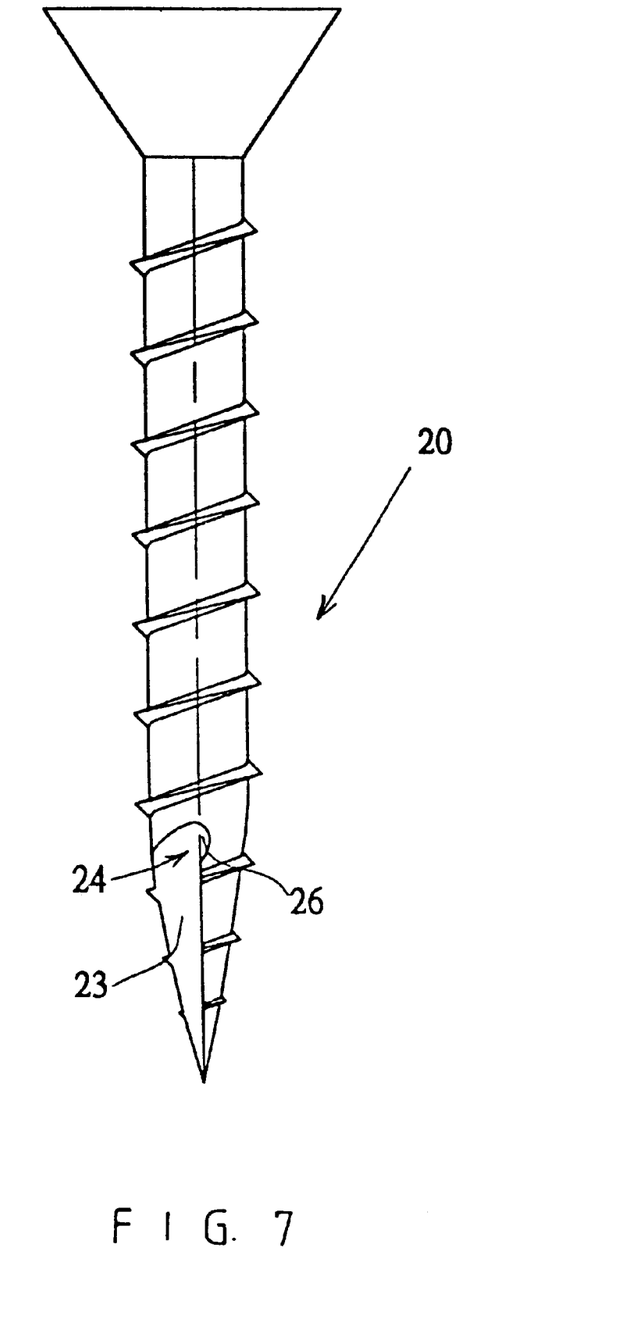
FIG. 7 is a front plan view of a flat headed screw structure in accordance with a second embodiment of the present invention.
Figure 8:
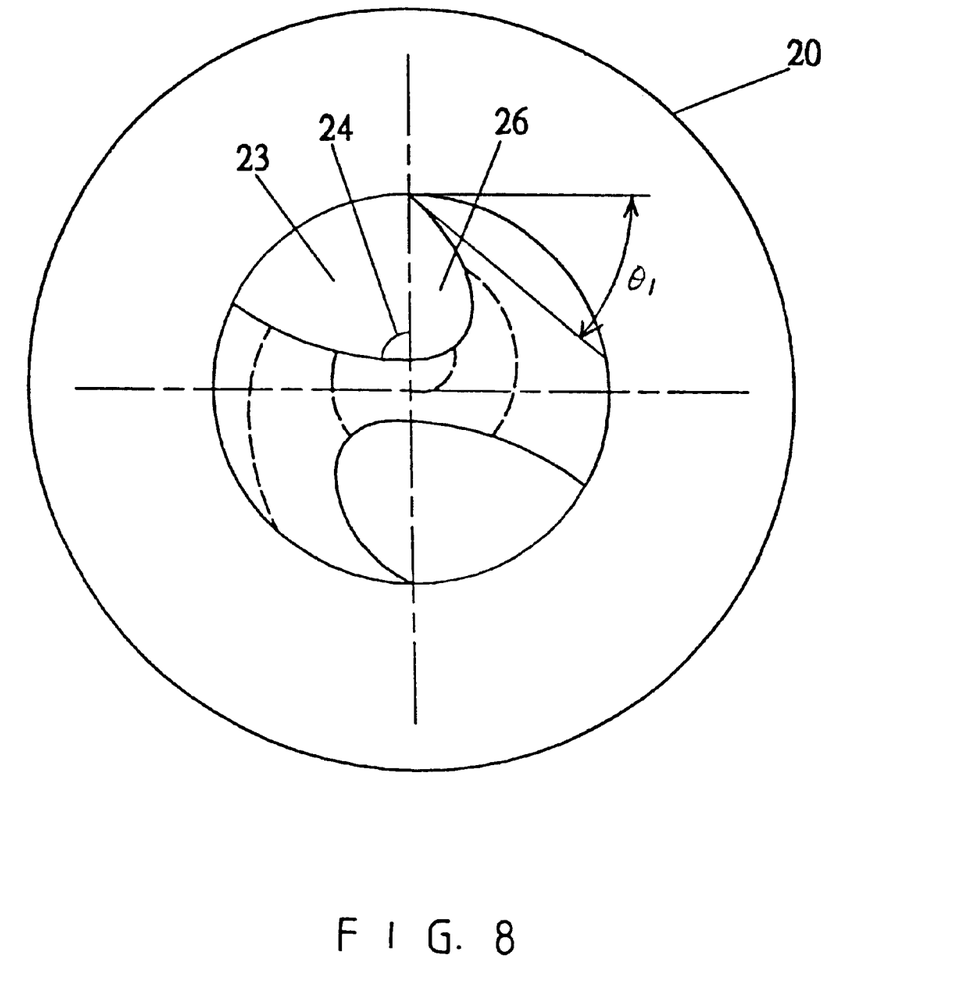
FIG. 8 is a bottom plan view of the flat headed screw structure as shown in FIG. 7.

Referring to FIGS. 7 and 8, a flat headed screw structure 20 in accordance with a second embodiment of the present invention includes a construction similar to that of the flat headed screw structure 10 in accordance with the first embodiment of the present invention as shown in FIGS. 5 and 6.

The cut groove opening 24 located above the cut groove 23, and the scrap draining chute 26 are substantially arc-shaped, thereby providing the same functions as that of the first embodiment of the present invention. The cut groove opening 24 is substantially arc-shaped, thereby forming the so-called circular cutting blade.

Figure 9:
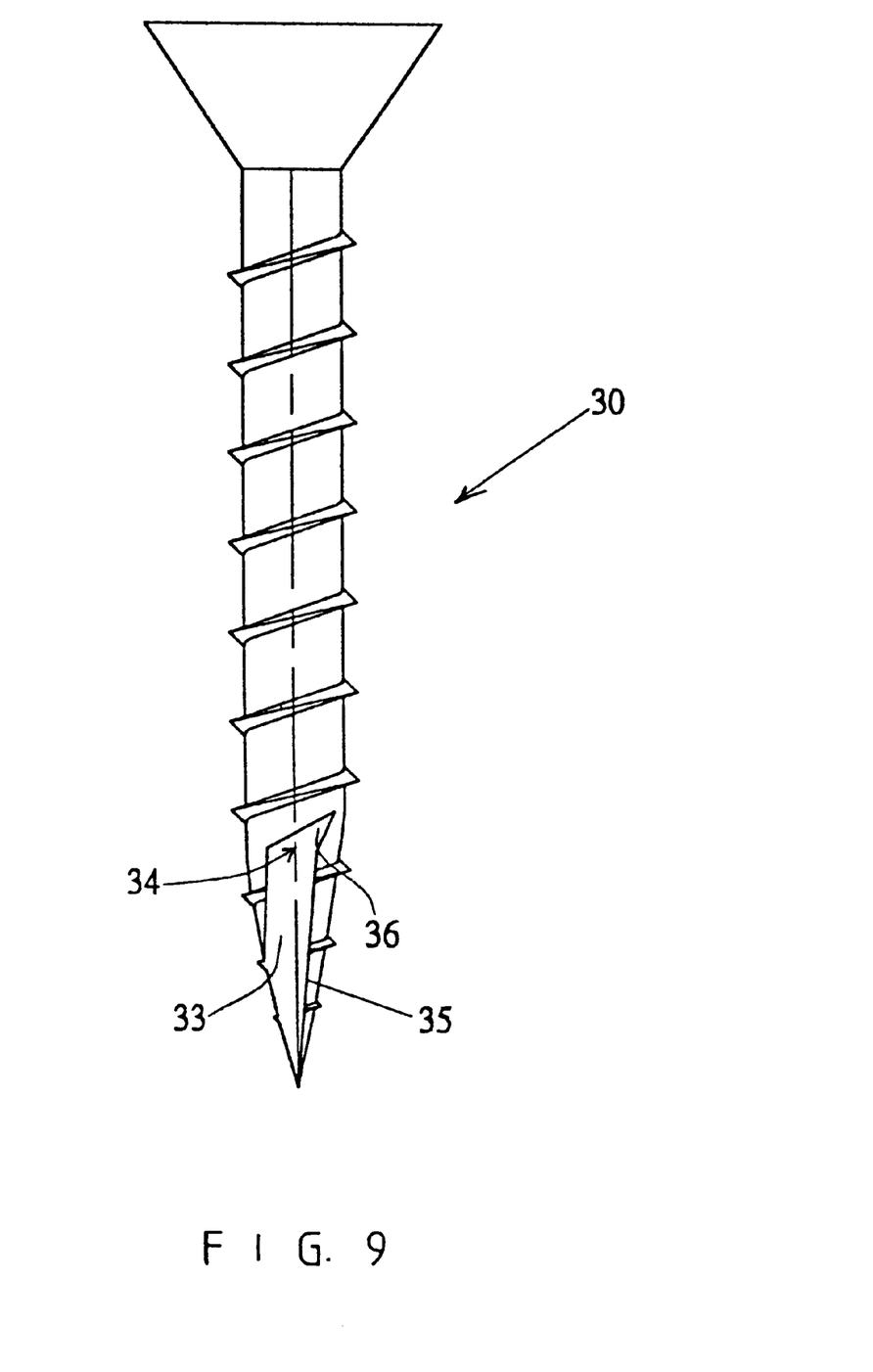
FIG. 9 is a front plan view of a flat headed screw structure in accordance with a third embodiment of the present invention.

Referring to FIG. 9, it shows a flat headed screw structure 30 in accordance with a third embodiment of the present invention. The two cut edges 35 of the cut groove 33 are substantially inclined edges, while the cut groove opening 34 and the scrap draining chute 36 are substantially right-angled.

Figure 10:
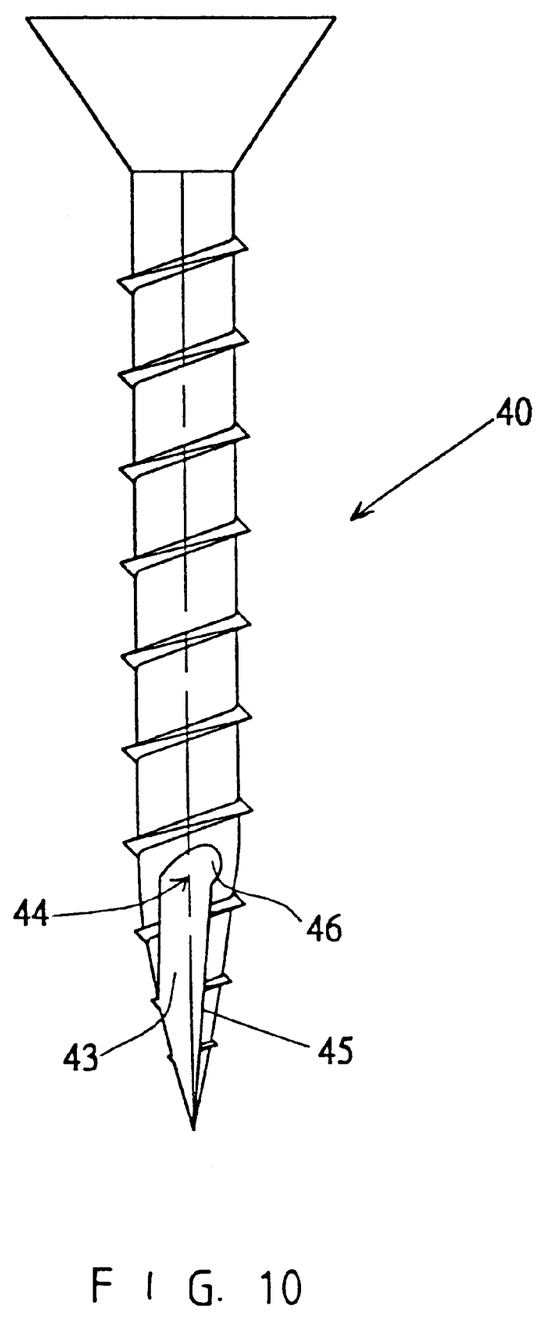
FIG. 10 is a front plan view of a flat headed screw structure in accordance with a fourth embodiment of the present invention.

Referring to FIG. 10, it shows a flat headed screw structure 40 in accordance with a fourth embodiment of the present invention. The two cut edges 45 of the cut groove 43 are substantially inclined edges, while the cut groove opening 44 and the scrap draining chute 46 are substantially arc-shaped.

Accordingly, the above embodiments describe a structure which has two cut grooves, whereby the screw body includes two symmetrical cutting openings and two symmetrical scrap draining chutes, thereby increasing the velocity of the screw body tapping into the workpiece, and thereby decreasing the torsion during rotation of the screw body, so that the screw body can be screwed and tapped into the workpiece more stably, thereby achieving the required effect.

Figure 11:
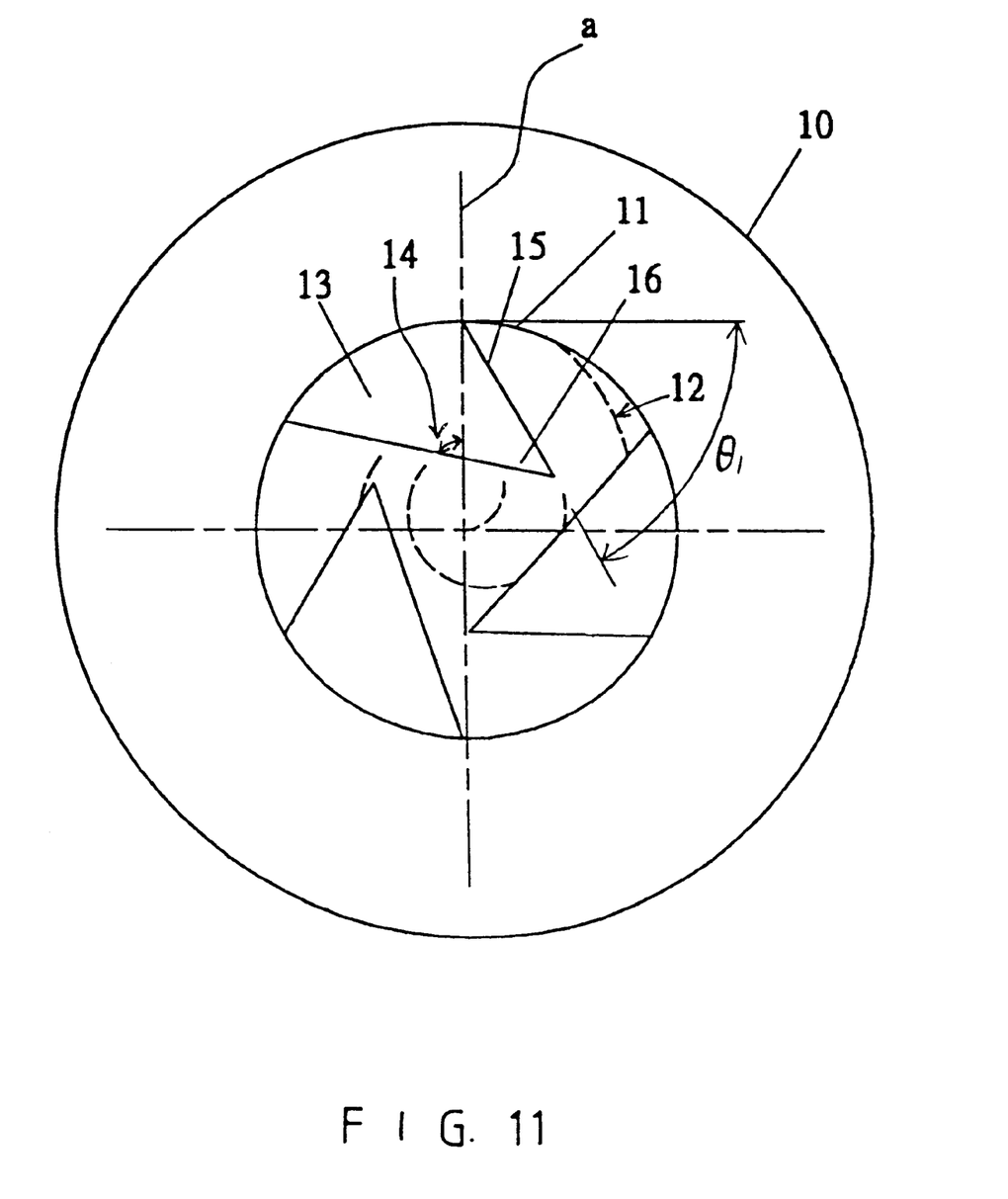
FIG. 11 is a bottom plan view of a flat headed screw structure in accordance with a fifth embodiment of the present invention.

Referring to FIG. 11, the flat headed screw structure 10 in accordance with a fifth embodiment of the present invention includes three cut grooves 13 for accelerating draining the scraps.

Figure 12:
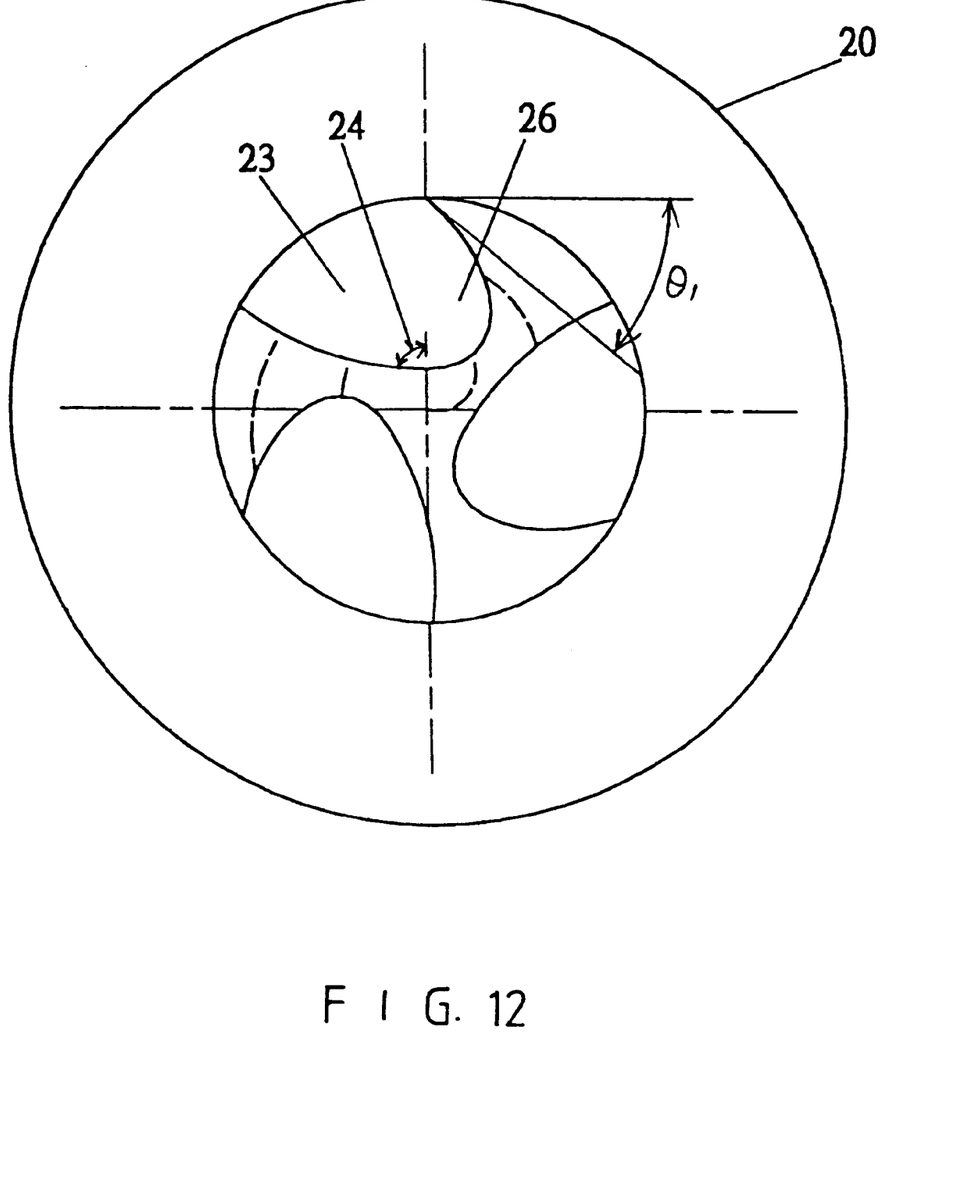
FIG. 12 is a bottom plan view of a flat headed screw structure in accordance with a sixth embodiment of the present invention.

Referring to FIG. 12, the flat headed screw structure 20 in accordance with a sixth embodiment of the present invention includes three arc-shaped cut grooves 23 for accelerating draining the scraps.

It should be clear to those skilled in the art that further embodiments may be made without departing from the scope of the present invention.

What is claimed is:

1. A self-drilling screw comprising:

a screw body including an axially extended thread formed in an outer peripheral portion thereof, and including a tail end having at least one cut groove formed therein, and said at least one cut groove including a top portion having a scrap draining chute formed therein and extended inward of said screw body, said scrap drainnig chute of said screw body being formed and defined by a pair of cut edges, and said cut edges being straight edges and including a sharp included angle formed therebetween.

* * * * *